United States Patent [19]
Beales et al.

[11] 4,275,951
[45] Jun. 30, 1981

[54] OPTICAL FIBRES AND GLASSES

[75] Inventors: Keith J. Beales; William J. Duncon, both of Ipswich; Anthony G. Dunn, Woodbridge; George R. Newns, Hintlesham, all of England

[73] Assignee: The Post Office, London, England

[21] Appl. No.: 105,652

[22] Filed: Dec. 20, 1979

Related U.S. Application Data

[63] Continuation of Ser. No. 919,238, Jun. 26, 1978, abandoned.

[30] Foreign Application Priority Data

Jun. 28, 1977 [GB] United Kingdom ............... 26924/77

[51] Int. Cl.$^3$ .................... C03C 3/08; C03C 13/00; G02B 5/14
[52] U.S. Cl. .................. 350/96.31; 65/3 A; 106/47 Q; 106/50; 106/54; 350/96.34
[58] Field of Search ............ 106/47 Q, 50, 54; 65/3 A; 350/96.34, 96.31

[56] References Cited

U.S. PATENT DOCUMENTS

| | | | |
|---|---|---|---|
| 3,822,120 | 7/1974 | Koizumi et al. | 350/96.34 |
| 3,841,882 | 10/1974 | Wolf | 350/96.34 |
| 3,853,384 | 12/1974 | Pinnow | 350/96.31 |
| 3,859,103 | 1/1975 | Yoshiyagawa et al. | 350/96.34 |
| 3,938,974 | 2/1976 | Macedo | 350/96.34 |
| 3,957,342 | 5/1976 | Newns et al. | 350/96.34 |
| 4,040,807 | 8/1977 | Midwinter et al. | 65/3 A |
| 4,057,320 | 11/1977 | Marcatilli | 350/96.31 |
| 4,094,689 | 6/1978 | Van Ass et al. | 350/96.31 X |
| 4,177,319 | 12/1979 | Jahn | 106/54 X |
| 4,179,188 | 12/1979 | Geckeler | 350/96.31 |

FOREIGN PATENT DOCUMENTS

| | | | |
|---|---|---|---|
| 1160535 | 8/1969 | United Kingdom | 350/96.31 |
| 214055 | 5/1968 | U.S.S.R. | 350/96.34 |

OTHER PUBLICATIONS

Van Ass, H. M. J. M. et al. "Preparation of Graded-Index Optical Glass Fibres in the Alkali Germanosilicate System" Electronics Letters vol. 12, No. 15, Jul. 1976, pp. 369-370.

Koizumi, K. et al. "New Light-Focusing Fibers Made by a Continuous Process" Applied Optics vol. 13, No. 2, Feb. 1974, pp. 255-260.

Uchida, T. et al. "Optical Characteristics of a Light--Focusing Fiber Guide and its Applications" IEEE J. of Quantum Electronics, vol. QE-6, No. 10, Oct. 1970, pp. 606-612.

Inoue, T. et al. "Low-loss Light-Focusing Fibres Manufactured by Continuous Process" Proc of the IEE, vol. 123, No. 6, Jun. 1976, pp. 577-580.

Primary Examiner—Helen M. McCarthy
Attorney, Agent, or Firm—Kemon & Estabrook

[57] ABSTRACT

A range of alkali metal borosilicate glass compositions modified by the addition of alkaline earth metal oxides has been found to be especially suitable for the production of graded index optical fibre by thermal diffusion using the double crucible method. A core glass chosen from this range may be paired with a suitable cladding glass so that, in the nozzle of the double crucible, alkaline earth metal exchange occurs to give a composition gradient of alkaline earth metal oxide and hence a gradation of refractive index. Using these glasses, fibres have been produced having refractive index profiles that approximate closely to the ideal parabolic distribution, numerical apertures of up to 0.21, and best loss values as low as 6.4 dB/km at 850 nm.

6 Claims, 11 Drawing Figures

—·— Limit of immiscibility region.

——— Lines of equal refractive index.

----- Lines of equal thermal expansion
25-400°C × $10^7$

OPTICAL FIBRES AND GLASSES

This is a continuation of application Ser. No. 919,238 filed June 26, 1978, now abandoned.

The present invention relates to optical fibres and to glasses suitable for the manufacture of optical fibres. The invention is especially concerned with graded index optical fibres and their production by thermal diffusion using the double crucible drawing technique.

In order to produce optical fibres suitable for use in telecommunications systems it is necessary to ensure that the loss in the optical fibres is 20 dB/km or less. This requirement imposes stringent conditions on the quality of the glasses from which the fibres are made. For example, it is important that such glasses should have a low concentration of transition metal ions and water, which give rise to absorption bands. It is also important that phase separation and devitrification should not occur in the glasses when the fibre is drawn, because even if present to only a slight extent these effects will result in glasses with a high scatter loss.

Up to the present time greatest success has been encountered with pure and doped vitreous silicas. It is possible to produce vitreous silica in an extremely pure state, so that absorption losses due to impurities are as low as 2 dB/km. In order to produce a second glass, with a refractive index different from that of pure silica, small quantities of dopants, for example, titanium dioxide, are added. In this way optical fibres can be made with a doped silica core and pure silica cladding. Such optical fibres have an extremely low loss. Because, however, of the higher softening point of vitreous silica, there are difficulties in the preparation of optical fibres from these materials. For example, the usual technique used in the fabrication of dielectric optical waveguides is to prepare a preform consisting of a clad rod and then to draw this down to a suitable diameter to form the dielectric optical waveguide.

From the point of view of convenience of manufacture the double crucible technique for drawing fibres is ideal. This technique involves melting two glasses, one in a first crucible and the other in a second crucible, the first crucible being located within the second crucible. Both crucibles have drawing nozzles. The fibre thus formed is a clad fibre which is capable of acting as a dielectric optical waveguide. Ideally low melting point glasses are required for the double crucible technique. Such glasses are however complex, containing as a rule at least three oxides, and this introduces problems in keeping the glass losses at a sufficiently low level to permit the production of satisfactory optical fibres. U.S. Pat. No. 3,957,342 describes and claims a family of sodium borosilicate glasses of low softening point and low absorption and scatter loss which have proved highly satisfactory for the production of stepped index optical fibres.

The double crucible drawing technique is especially well adapted for the production of graded index fibre by thermal diffusion: see, for example, U.S. Pat. No. 4,040,807 and Proceedings of the Second European Conference on Optical Fibre Communications, Paris, September 1976, pages 21-26. In this process, the core and clad glasses are subjected to a heat treatment which permits inter-diffusion of the mobile oxides in the two glasses, this heat treatment being carried out during the drawing operation by controlling the length of the drawing nozzle in the double crucible. Using the glasses described and claimed in U.S. Pat. No. 3,957,342, graded index fibre suitable for a wide range of applications can be produced by this process, but the quality is not of the very highest.

The present invention is concerned with a family of glasses related to those defined in U.S. Pat. No. 3,957,342, but modified by the addition of alkaline earth metal oxides. These glasses show considerable potential for the production of high quality graded index fibre by the double crucible method. It is believed that the oxide responsible for the gradation of refractive index is the alkaline earth metal oxide. Glass pairs for fibre core and cladding may readily be produced, the two glasses having significantly different refractive indices. If desired, the glasses may be matched so as to have substantially the same coefficient of thermal expansion, but this is not essential.

Previously it had been thought that calcium oxide, for example, was not able to diffuse readily at fibre-drawing temperatures. We have, however, demonstrated that this is incorrect, and that calcium oxide and other alkaline earth metal oxides can be used in thermal diffusion techniques for the production of graded index fibre. This represents a major advance in the state of the art with regard to the production of graded index fibre using the double crucible technique.

Figure 1:
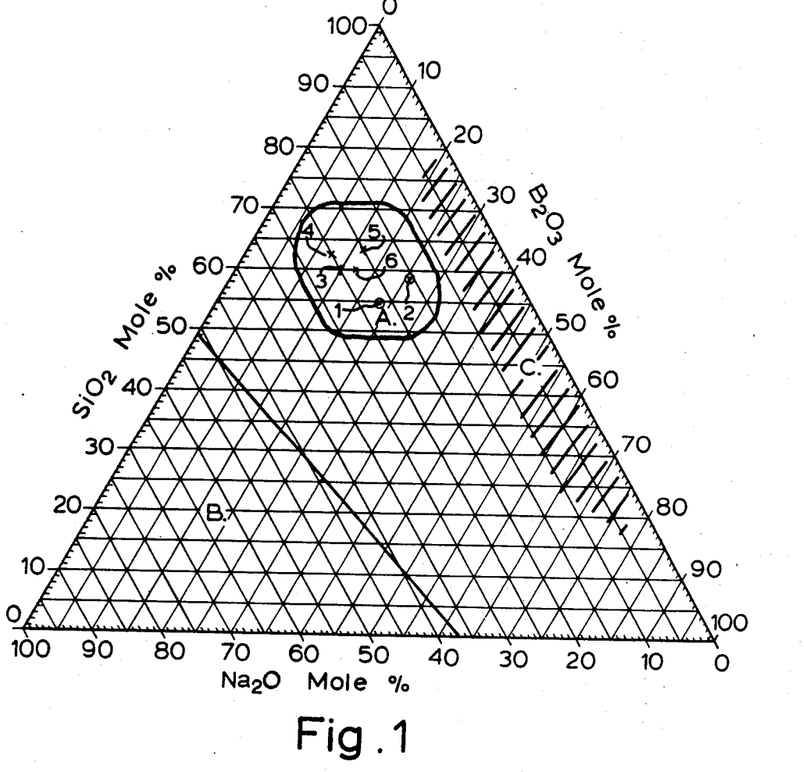
FIG. 1 shows a triaxis plot of the soda-boro-silicate glass system.

According to a first aspect of the present invention there is provided a four-component glass suitable for the manufacture of optical fibre, the said glass having a composition calculated by taking a particular notional sodium oxide-boric oxide-silica composition lying within the range defined by region A of FIG. 1 of the accompanying drawings, and partially replacing sodium oxide or sodium oxide and silica by one or more alkaline earth metal oxides in such a proportion that the total content of alkaline earth metal oxide in the glass is within the range of from 0 to 20 mole percent, the composition of the glass lying outside the region of compositions that undergo phase separation or devitrification during optical fibre production.

The glass of the invention preferably contains only one alkaline earth metal oxide, and that oxide is preferably calcium oxide or barium oxide.

It appears that any soda-boro-silicate glass falling within the region A of FIG. 1 of the accompanying drawings can be modified by the addition of an alkaline earth metal oxide to form a glass suitable for use in the production of optical fibre. The upper limit for silica has been set at about 70 mole percent because above this limit difficulties in homogenisation and in melting in silica crucibles are encountered. The lower limit for silica has been set at about 50 mole percent because of poor glass durability below this value. The lower limit for sodium oxide has been set at 13 mole percent because of problems due to phase separation of the glass below this limit and the upper limit has been set at 33 mole percent because of lack of data on glasses with higher soda content.

A glass according to the invention may advantageously be paired with a glass having the corresponding unsubstituted soda-boro-silicate composition to make optical fibre, the glass of the present invention being used for the core and the unsubstituted glass for the cladding. Advantageously, the thermal expansivities of the two glasses may be matched, ie, the proportion of alkaline earth metal oxide in the core glass may be such that the thermal expansion coefficient between 0° C. and the glass transition temperature of the four-component glass is substantially the same as that of the corresponding soda-boro-silicate glass.

If the alkaline earth metal oxide is calcium oxide, thermal expansivity matching may be achieved if substitution of sodium oxide and silica by calcium oxide is in such a proportion that the total molar percentage ($Na_2O + XCaO$) in the four-component glass is equal to the molar percentage of $Na_2O$ in the three-component glass, where $X = 0.34 \pm 0.03$. The basis of this relationship is given in detail in Example 1 below.

According to a second aspect of the present invention there is provided a glass optical fibre having a core and a cladding, the core comprising a first glass, according to the invention, as previously defined, and the cladding comprising a second glass of different refractive index from the first glass and having a soda-boro-silicate composition lying within the range defined by region A of FIG. 1 of the accompanying drawings.

As indicated above, the composition of the cladding glass is advantageously also the notional composition from which the four-component composition of the core glass is derived by substitution. This is not, however, essential.

The thermal expansion coefficients of the core and clad glasses are advantageously substantially equal.

Preferably the said optical fibre is a graded index fibre and the gradation of refractive index is produced by thermal diffusion.

According to a third aspect of the present invention there is provided a glass optical fibre having a core and a cladding both made of glasses according to the invention as previously defined, the refractive indices of the core and cladding glasses being different from one another.

Preferably the said optical fibre is a graded index fibre and the gradation of refractive index is produced by thermal diffusion. Advantageously the core and clad glasses contain different alkaline earth metal oxides, the oxide of the heavier metal normally being in the core glass. For example, the core glass may contain barium oxide and the cladding glass calcium oxide, or the core glass may contain calcium oxide and the cladding glass magnesium oxide.

According to a fourth aspect of the present invention there is provided a graded index glass optical fibre having a core of a glass comprising
(a) silica,
(b) boric oxide,
(c) one or more alkali metal oxides selected from sodium oxide and potassium oxide, and
(d) one or more alkaline earth metal oxides selected from calcium oxide, strontium oxide and barium oxide, and a cladding of a glass comprising
(a) silica,
(b) boric oxide,
(c) one or more alkali metal oxides selected from sodium oxide and potassium oxide,
and, optionally,
(d) one or more alkaline earth metal oxides selected from calcium oxide, strontium oxide, barium oxide and magnesium oxide, the said core and said cladding glasses having different refractive indices and having compositions selected to exclude glasses which undergo phase separation or devitrification during fibre production, the said gradation of refractive index being at least partly caused by a composition gradient of one or more alkaline earth metal oxides. If desired, the thermal expansion coefficients of the core and clad glasses may be matched.

Calcium oxide, barium oxide and strontium oxide all behave similarly in glasses and all of these oxides are suitable additives for the core glass of the fibre according to the invention. The dependence of refractive index on alkaline earth metal oxide content is much stronger for barium oxide than for calcium oxide, so that a given molar percentage of barium oxide should give a fibre of higher numerical aperture than could be produced using the same amount of calcium oxide. Magnesium oxide lowers the refractive index slightly and is therefore useful as an additive to cladding glasses. Possible combinations of alkaline earth metal oxides giving the correct refractive index relationships include the following:

| Core | Cladding |
|------|----------|
| CaO  | —        |
| SrO  | —        |
| BaO  | —        |
| CaO  | MgO      |
| SrO  | MgO      |
| BaO  | MgO      |
| SrO  | CaO      |
| BaO  | CaO      |
| BaO  | SrO      |

Furthermore, the alkali metal oxide present in the core and cladding glasses may be either sodium oxide or potassium oxide, giving a further area of choice. The potash-boro-silicate glass system is in many ways similar to the soda-boro-silicate system except that the region of stable glass formation is smaller. If, for example, sodium oxide is used in the core glass and potassium oxide in the clad glass, sodium-potassium exchange can occur in the double crucible in addition to alkaline earth metal oxide diffusion. The provision of several diffusion species enables a better approach to the optimum refractive index profile to be produced.

One glass pair which has been tested and found to be promising (see Example 5 below) is one in which the core glass contains barium oxide, sodium oxide, silica and boric oxide and the cladding glass contains calcium oxide, potassium oxide, silica and boric oxide. During fibre production sodium-potassium exchange occurs with a fast diffusion coefficient and barium oxide-calcium oxide exchange occurs with slower diffusion coefficient, the diffusion taking place with little change to the glass network.

Other oxides may be added to the glasses according to the invention, up to a total of about 5 mole percent, the only limitation on these additives being that they should not cause substantial worsening of the optical properties, for example, absorption loss of the glass. For example, arsenic trioxide may be added, as described in U.S. Pat. No. 3,957,342, to stabilise the redox state of the glass, or alumina may be added to improve the chemical durability. The use of the latter additive may be advantageous in the case of glasses containing potassium oxide.

The following Examples illustrate the invention. The batch materials used for the preparation of the various glasses described were commercially available materials. The boric oxide, sodium carbonate, potassium carbonate, alumina and silica used in Examples 1 to 4 typically contained from 0.05 to 0.2 ppm by weight of iron, 0.01 to 0.04 ppm by weight of copper, less than 0.05 ppm by weight of chromium and less than 0.01 ppm of other transition elements. The ultra-pure calcium carbonate and barium carbonate used contained less than 100 parts by weight in $10^9$ of manganese, less than 20 parts by weight in $10^9$ of iron, less than 10 parts by weight in $10^9$ of copper, less than 10 parts by weight in $10^9$ of nickel, less than 30 parts by weight in $10^9$ of chromium and less than 5 parts by weight in $10^9$ of cobalt. Less pure materials were used in Examples 5 and 6.

BRIEF DESCRIPTION OF THE DRAWINGS

In the Examples reference will be made to the accompanying drawings, in which.

COMPARATIVE EXAMPLE

Referring to FIG. 1 of the accompanying drawings, points representing two soda-boro-silicate glasses which have been used to produce graded index optical fibre by thermal diffusion with a double crucible are labelled 1 and 2, 1 being the core glass and 2 the cladding glass. Graded index fibre produced from these glasses had a total optical loss of 9-15 dB/km, a part of which was of unknown origin, ie, due neither to absorption loss nor to Rayleigh scatter loss. The pulse broadening of this fibre was in the range of from 1-5 ns/km. Furthermore, when viewed optically, the core displayed a ring structure of uncertain origin. Finally, the numerical aperture had a typical value of 0.12. While this fibre is of use for certain applications, it is not ideal for telecommunications purposes. The low pulse broadening is probably caused at least in part by inter-mode coupling which would account for the poor total loss. It is suspected that the visible ring may in some way be produced by thermal mismatch between the core and cladding glasses. The diffusing species producing the graded index in this glass pair is of course sodium oxide. Using soda-boro-silicate glasses the problem of obtaining a thermal expansion match between core and cladding and at the same time getting a reasonably large numerical aperture by obtaining a significant difference between core and cladding refractive indices is extremely difficult to solve. For this reason it was decided to look into the possibility of modifying the simple soda-boro-silicates by the addition of a further oxide.

Despite the fact that calcium oxide would appear to be an unlikely material to use because it was believed to have a low diffusion coefficient, it was decided to try this material because there was a little ultra-pure calcium carbonate available in the laboratory at a time when no other ultra-pure materials apart from boric oxide, silica and sodium carbonate were available. Much to our surprise we discovered that, contrary to previously held beliefs, calcium oxide was capable of diffusing at the drawing temperature of the optical fibres with a diffusion coefficient of from $10^{-8}$ to $10^{-7}$ cm$^2$ sec$^{-1}$, only very slightly slower than that of sodium oxide. The explanation for this discovery would appear to be that previous measurements of diffusion coefficient for calcium oxide were made at or below the glass transition temperature where the diffusion coefficient of calcium oxide is at least 100 times lower than that for sodium oxide. Calcium oxide has, however, a high activation energy for diffusion. This means that the diffusion coefficient increases with temperature much more rapidly for calcium oxide than for sodium oxide, hence the high diffusion coefficient for calcium oxide at the fibre drawing temperature.

EXAMPLE 1

A core glass was produced having the following composition: sodium oxide 22.30 mole percent (22.8 wt. %), boric oxide 15.00 mole percent (16.9 wt. %), silica 54.70 mole percent (52.5 wt. %), calcium oxide 8 mole percent (7.1 wt. %). The glass was prepared by the method described in detail in U.S. Pat. No. 3,957,342, ie, appropriate batch material was melted to produce molten glass, and a mixture of carbon monoxide and carbon dioxide was bubbled through the molten glass in order simultaneously to optimise the redox state of the glass and to homogenise and dry it. The glass also contained about 0.1 mole percent of arsenic trioxide as a redox buffering oxide, as also described in U.S. Pat. No. 3,957,342.

The glass composition was derived from a notional soda-boro-silicate composition of sodium oxide 25.00 mole percent, boric oxide 15.00 mole percent and silica 60.00 mole percent (indicated by point 3 in FIG. 1), the calcium oxide replacing both soda and silica.

A graded index fibre was drawn using the four-component glass described above for the core and, for the cladding, a soda-boro-silicate glass of the composition given in the previous paragraph. The fibre was drawn using a Johnson Mathey platinum double crucible with a 10 cm nozzle. The core diameter of the fibre was 46 microns.

Figure 2:
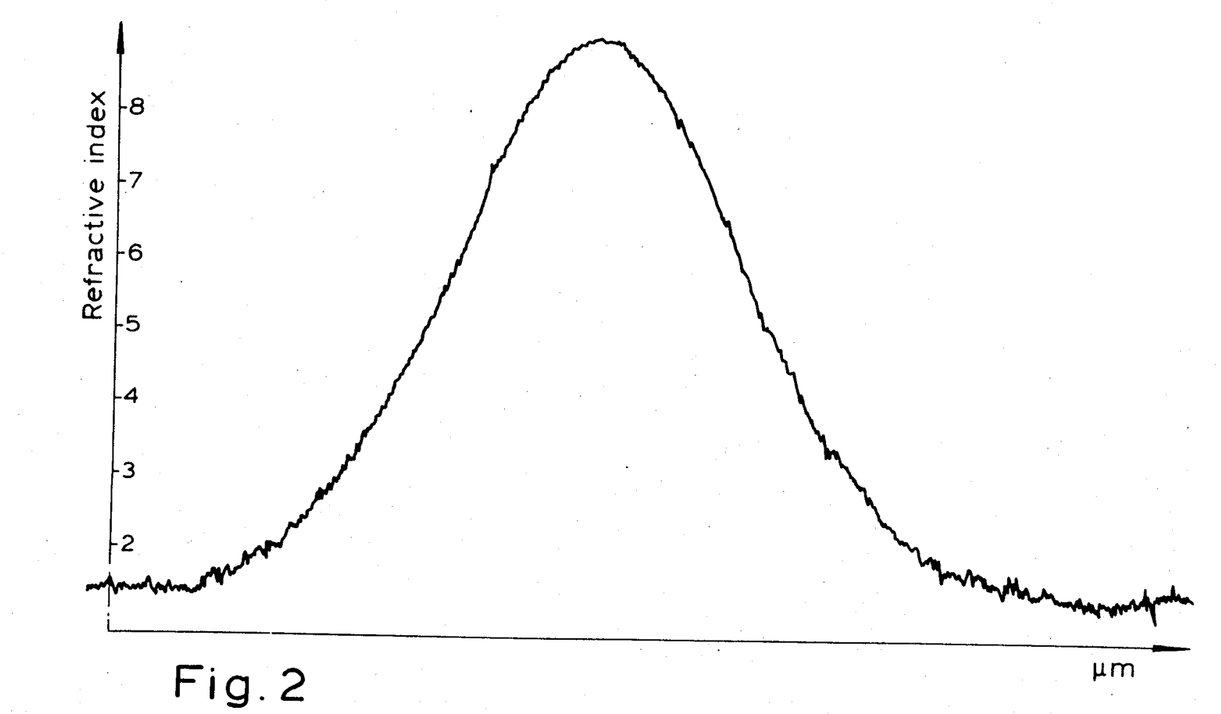
FIG. 2 shows the refractive index profile of the optical fibre of the invention described in Example 1.

The refractive index profile of the fibre is shown in FIG. 2. This is a slightly over-diffused profile, ie, too much diffusion has occurred to give the optical parabolic refractive index distribution. The extent of diffusion $\phi$, which ideally should have a value of from 0.06 to 0.08, was calculated from the measured profile to have a value of 0.20. The quantity $\phi$ is given by the equation:

$$\phi = Dt/A^2 = DL/a^2v$$

where

D is the diffusion coefficient (dependent on temperature), t is the residence time of the glass in the nozzle (also temperature-dependent), A is the radius of the core stream in the double crucible, L is the length of the diffusion nozzle of the double crucible, a is the radius of the fibre, and v is the pulling speed of the fibre.

It will be seen that the extent of diffusion can be reduced without much difficulty, by, for example, reducing the length of the nozzle, increasing the pulling speed or decreasing the core size. Increasing the amount of diffusion is much more difficult.

Figure 3:
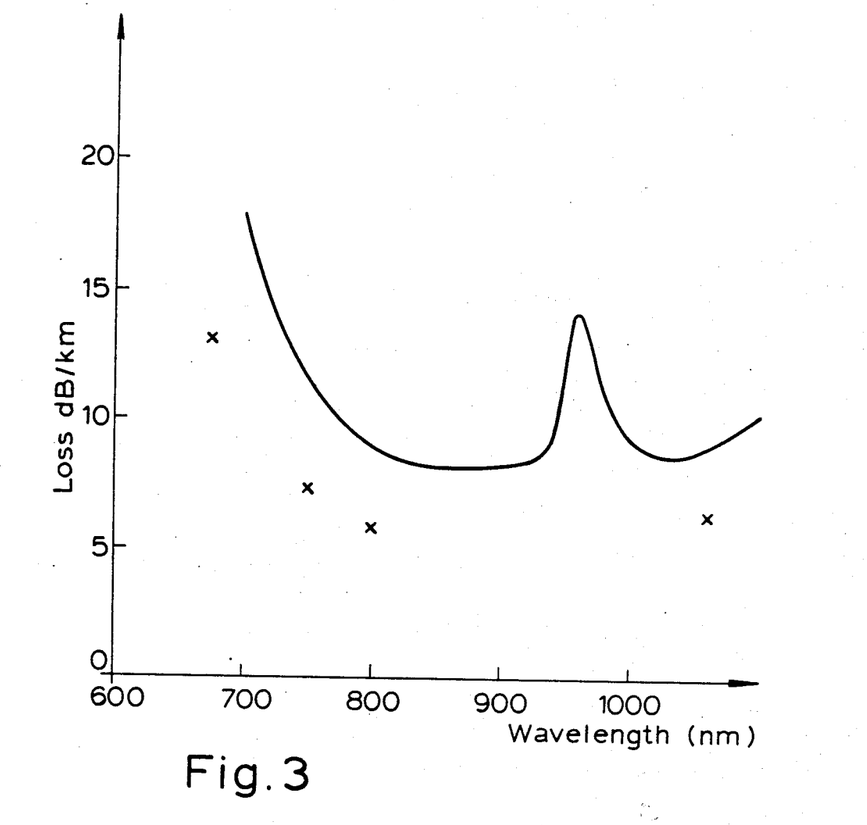
FIG. 3 shows a plot of total insertion loss against wavelength for the fibre of Example 1.
Figure 4:
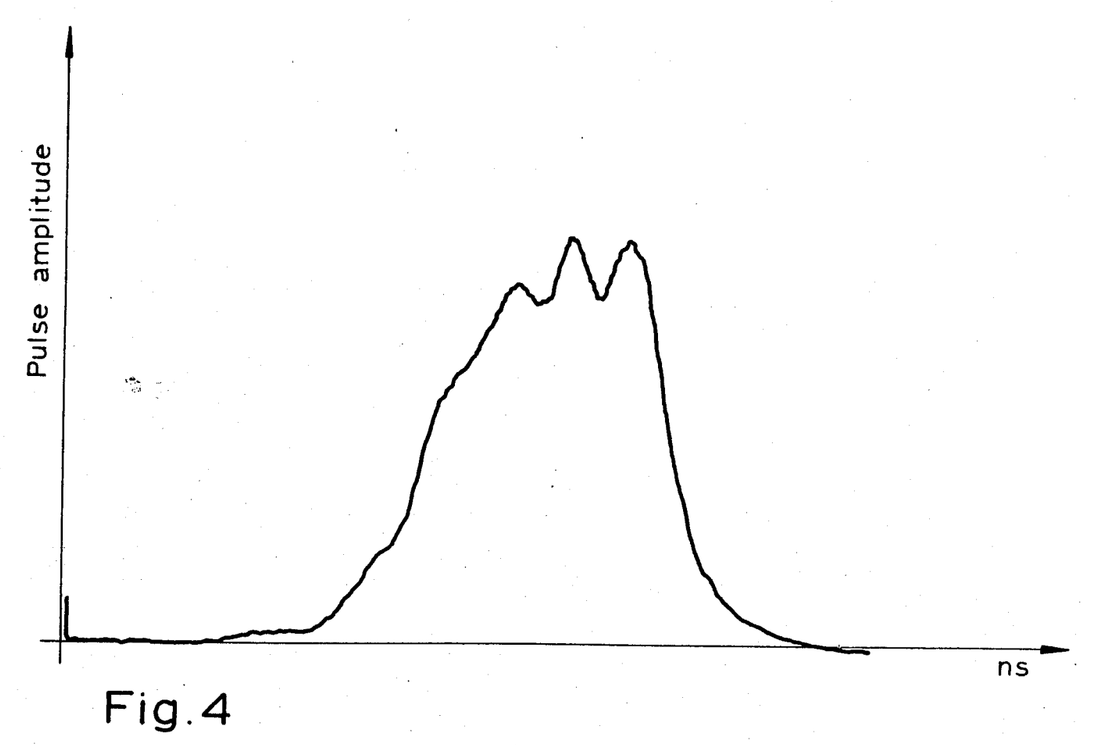
FIG. 4 shows the pulsewidth response for the fibre of Example 1.

FIG. 3 shows a plot of total loss against wavelength for full numerical aperture launch. From this Figure it can be seen that the total insertion loss of the fibre at 850 to 900 nanometers is 8.2 dB/km. The absorption loss at selected wavelengths is indicated on FIG. 3 by a series of crosses, showing the scatter loss to be approximately 2.5 dB/km which approaches the theoretically predicted loss due to Rayleigh scattering. This means that pulse width measurements on this fibre will give meaningful results. The pulse width of a one-nanosecond pulse after transmission through 1.91 km of fibre is shown in FIG. 4. From this it can be seen that the pulse broadening for the fibre is 2.8 ns/km.

The numerical aperture was calculated from the refractive index profile to be 0.18. As will be seen below (Examples 5 and 6) the use of barium oxide instead of calcium oxide in the core glass gives higher numerical aperture values; the use of a higher proportion of calcium oxide has a similar but less marked effect.

From the various figures quoted above it will be apparent that this glass pair is an extremely good combination to use for high-bandwidth low-loss graded index fibre. Successive lengths of fibre drawn from this glass pair gave completely reproducible properties, as did fibre from different fibre patches. It will be noted that the composition of the core glass was computed from the clad glass composition in accordance with the equation $$(Na_2O + 0.34 CaO)_{core} = (Na_2O)_{clad}$$

mentioned above, ie, the thermal expansivities of the core and clad glasses are matched. The matching was tested by melting samples of the two glasses, one on top of the other, in a crucible, and then cooling, annealing and sectioning the resulting composite. The sample obtained was free from cracks and exhibited only minor stress at the interface when examined in a strain viewer. This indicates that both glasses had substantially the same thermal expansion coefficient.

Figure 10:
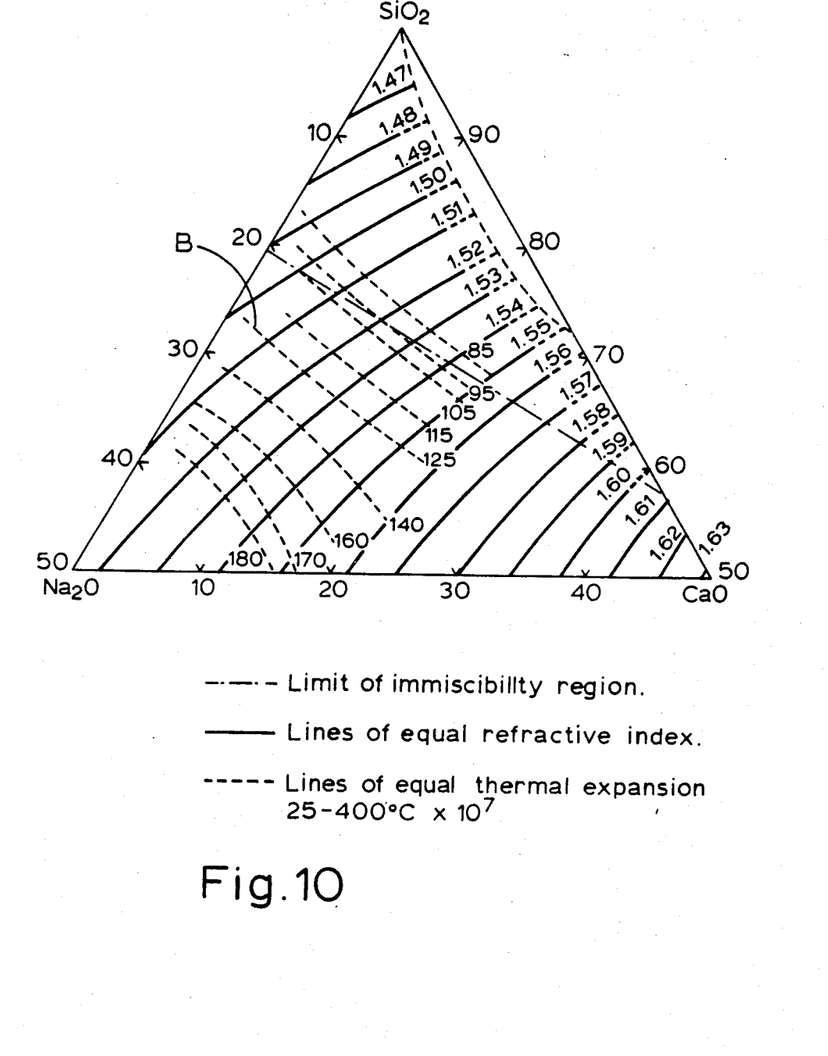
FIG. 10 shows a triaxis plot of thermal expansion coefficient data for the soda-lime-silicate glass system based on published data.
Figure 11:
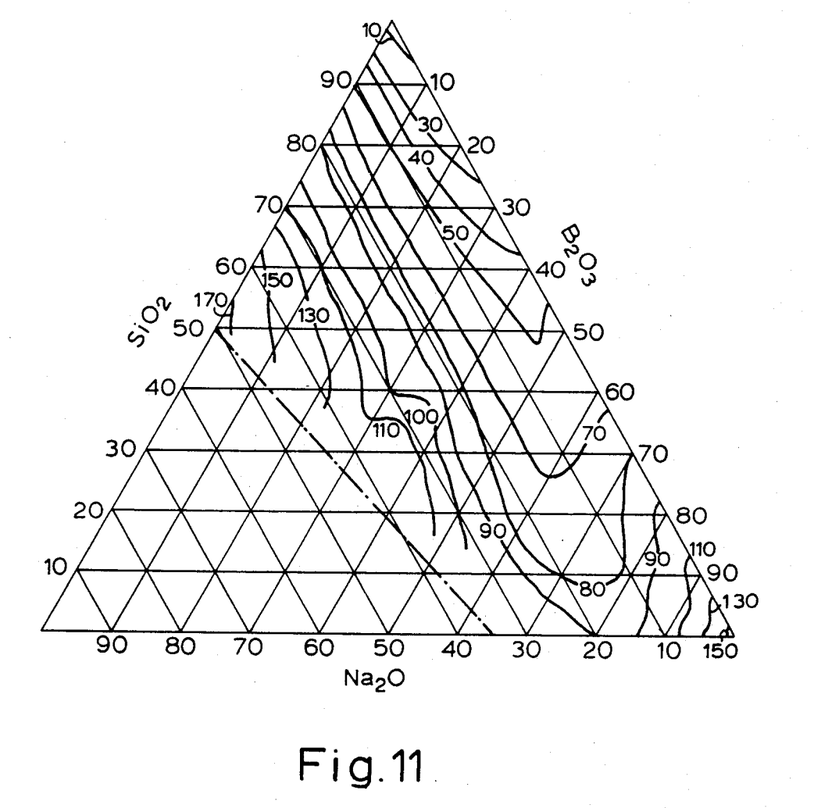
FIG. 11 shows a triaxis plot of thermal expansion coefficient data for the soda-boro-silicate glass system based on published data.

The matching occurs because the substitution of calcium oxide for sodium oxide and silica has been carried out in such a manner that glass compositions with increasing calcium oxide lie on a line of constant expansion coefficient. In FIG. 10 lines of equal expansion coefficient for the soda-lime-silicate system are shown. In FIG. 11 lines of equal expansion coefficient for the soda-boro-silicate system are shown. FIGS. 10 and 11 are based on published data originating from different sources. While the data for both FIGS. 10 and 11 are reasonably internally consistent, there is disagreement between the absolute values. To overcome this problem, it has been assumed that, in the region of interest, the expansivity of soda-boro-silicate glasses is independent of the ratio of boric oxide to silica; this can be clearly seen from FIG. 11. Turning to FIG. 10, in terms of expansivity boric oxide and silica can be regarded as the same material so that only the variation of expansivity with sodium oxide and calcium oxide need be considered. The equation of a line of constant expansivity in the soda-lime-silicate system is therefore determined. For the line marked "B" in FIG. 10 the equation is $$Na_2O + 0.34 CaO = Na_2O$$

content of the binary soda-silicate glass having a given thermal expansion coefficient. By varying sodium oxide and calcium oxide in accordance with this equation glasses having the same thermal expansion coefficient will be produced. The coefficient of 0.34 appearing in the above equation should not vary appreciably with varying glass compositions in the region A of FIG. 1, since when these are transposed to FIG. 10, the lines of constant expansion coefficient are all substantially parallel.

EXAMPLE 2

A fibre was prepared from a core glass having a composition as described in Example 1 and a cladding glass having the composition sodium oxide 25.00 mole percent (25.7 wt. %), boric oxide 12.50 mole percent (14 wt. %) and silica 62.50 mole percent (60.3 wt. %). The clad composition is represented by point 4 on FIG. 1. The glass was prepared as described in Example 1 and the fibre was again drawn using a Johnson Mathey platinum double crucible with a 10 cm nozzle: the core diameter was 53 microns.

Figure 5:
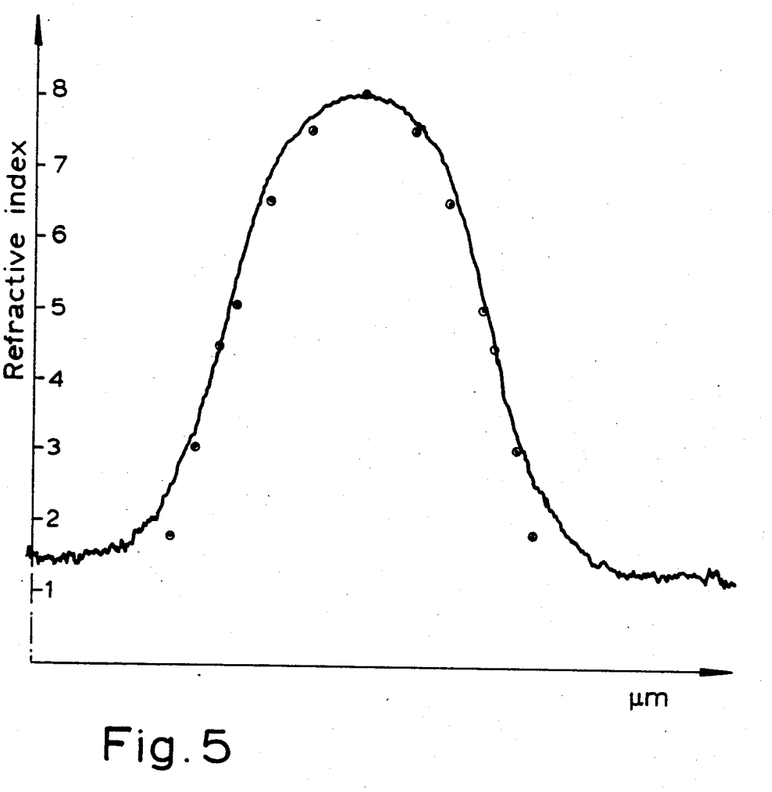
FIG. 5 shows the refractive profile of the fibre of Example 2.

The refractive index profile is shown in FIG. 5. The extent of diffusion $\phi$ was calculated to be 0.05, ie, the fibre is slightly under-diffused.

The best loss value on this fibre was found to be 6.5 dB/km at 850 nm, and the pulse broadening was about 2 ns/km. The maximum numerical aperture was 0.197.

This glass pair is clearly suitable for use in the production of high-bandwidth low-loss graded index fibre. Use of barium oxide instead of calcium oxide in the core should result in a higher numerical aperture.

EXAMPLE 3

Graded-index fibre was produced from a core glass having the composition sodium oxide 17.30 mole percent (17.8 wt. %), boric oxide 17.50 mole percent (19.6 wt %), calcium oxide 8 mole percent (17.2 wt. %) silica 57.20 percent (55.3 wt. %) and a clad glass having the composition sodium oxide 20.00 mole percent (20.5 wt. %), boric oxide 17.50 mole percent (19.5 wt. %) and silica 62.50 mole percent (60 wt. %). The glasses were prepared as described in Example 1. The clad composition is represented by point 5 on FIG. 1, and the core composition is derived from that composition by substitution of calcium oxide, to an extent of 8 mole percent for soda and silica.

Figure 6:
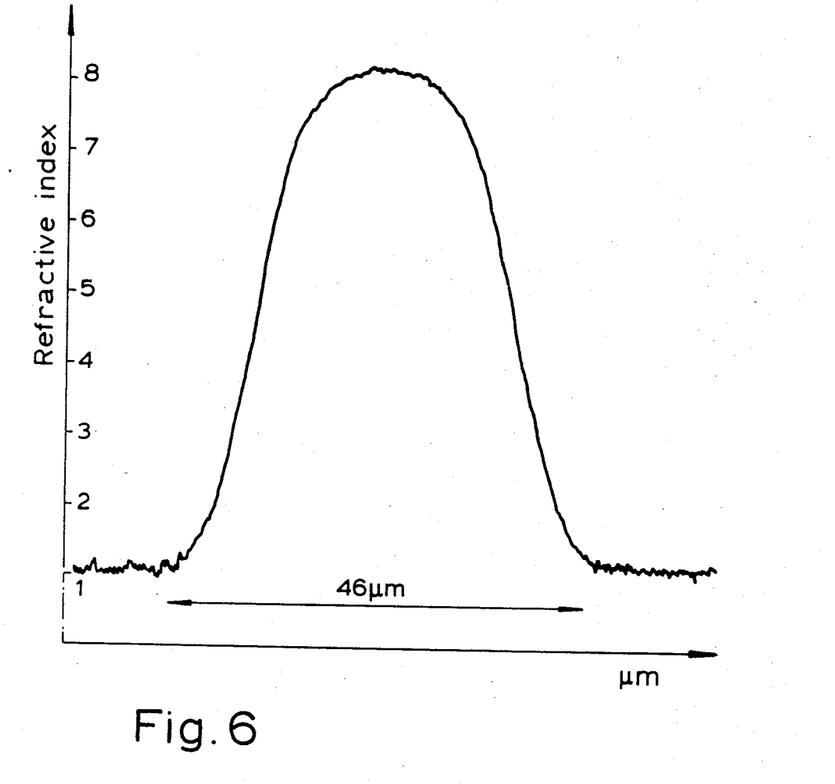
FIG. 6 shows the refractive index profile of the fibre of Example 3.

The fibre was drawn using a Johnson Mathey platinum double crucible with a 10 cm nozzle. The core diameter of the fibre was 46 μm. Its refractive index profile is shown in FIG. 6; this is a slightly under-diffused profile, the $\phi$-value being approximately 0.04. The best loss value obtained with this fibre was 6.4 dB/km at 850 nm.

EXAMPLE 4

A soda-boro-silicate glass having the composition sodium oxide 22.50 mole percent (23 wt. %), boric oxide 17.50 mole percent (19.5 wt. %) and silica 60.00 mole percent (57.5 wt. %) (point 6 on FIG. 1) was chosen as a suitable cladding glass for graded-index fibre and this time a core composition was selected by replacing soda only, not soda and silica, with calcium oxide. The core composition was sodium oxide 15.00 mole percent (19.7 wt. %), boric oxide 17.50 mole percent (19.7 wt. %) calcium oxide 7.50 mole percent (6.8 wt. %) and silica 60.00 mole percent (58.1 wt. %). Both glasses were prepared as described in Example 1.

Figure 7:
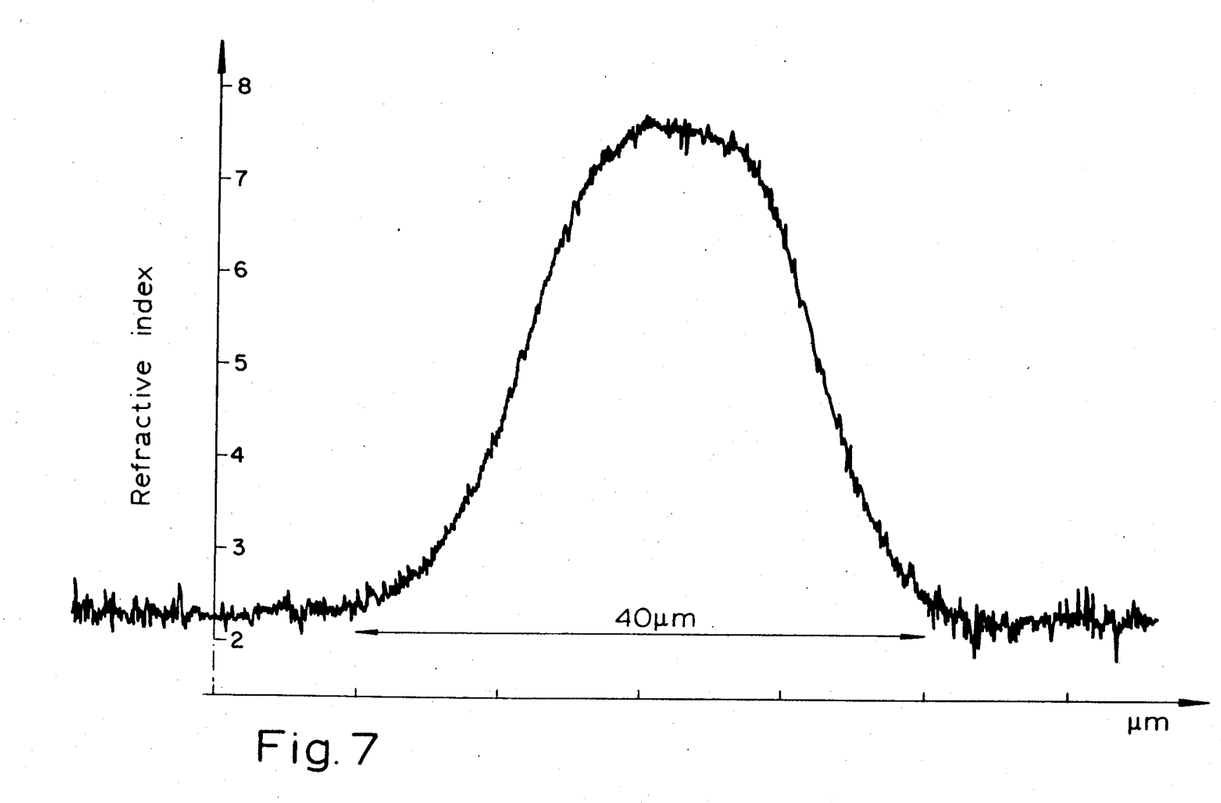
FIG. 7 shows the refractive index profile of the fibre of Example 4.

Fibre was drawn from this glass pair using a Johnson Mathey platinum double crucible with a 10 cm nozzle. The core diameter was 40 μm. The refractive index profile is shown in FIG. 7; the $\phi$-value was calculated to be 0.06, which is at the lower end of the ideal range. The maximum numerical aperture was 0.150, and the best loss value 9.0 dB/km at 850 nm.

It will be seen that this glass pair is exceptionally suitable for the production of low-loss graded-index optical fibre.

EXAMPLE 5

A core glass having the following composition was prepared: sodium oxide 19.27 mole percent (16.6 wt. %), boric oxide 7.23 mole percent (6.8 wt. %), barium oxide 12.04 mole percent (24.9 wt. %), alumina 3.62 mole percent, (5 wt. %) silica 57.82 mole percent (46.7 wt. %). The clad glass chosen had the following composition: Potassium oxide 19.27 mole percent (26.5 wt. %) boric oxide 7.23 mole percent (7.4 wt. %, calcium oxide 12.04 mole percent (9.9 wt. %), alumina 3.62 mole percent (5.4 wt. %) 57.82 mole percent (50.8 wt. %). It will be noted that the percentages of silica and boric oxide are the same in core and cladding, and the molar percentages of the monovalent diffusing species ($Na^+$ and $K^+$) and of the divalent diffusing species ($Ba^{2+}$ and $Ca^{2+}$) are matched.

The alumina was included to improve the chemical durability of the glass. The starting materials used in this Example were not of such high priority as in the previous Examples, and the gas-bubbling stage was omitted. Because of this it was not possible to obtain loss and pulse-broadening measurements on the fibre produced in this run, which was carried out purely in order to obtain a refractive index profile.

Figure 8:
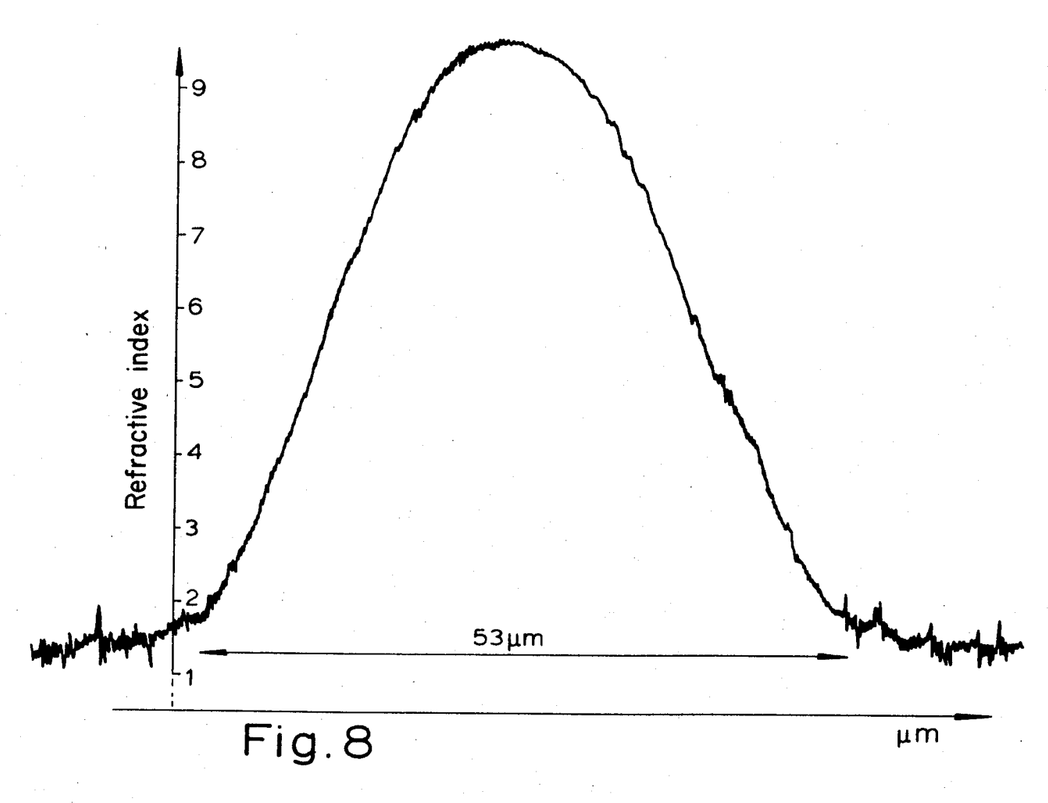
FIG. 8 shows the refractive index profile of the fibre of Example 5.

Fibre having a core diameter of 55 μm was drawn using a Johnson Matthey platinum double crucible with a 10 cm nozzle. The refractive index profile is shown in FIG. 8. The $\phi$-value was 0.08, the best yet obtained with this Class of glasses, and the maximum numerical aperture was 0.21. It will be seen that this glass pair is extremely promising for use in the production of graded-index fibre.

EXAMPLE 6

This Example illustrates the use of barium oxide in the core and calcium oxide in the clad, all other components of the 2 glasses being the same. As in Example 5, the starting materials were not sufficiently pure for loss and pulse broadening measurements to be carried out.

The core composition was sodium oxide 20.00 mole percent (18 wt. %), boric oxide 10.00 mole percent (9.8 wt. %), barium oxide 10.00 mole percent (21.6 wt. %) and silica 60.00 mole percent, (50.6 wt. %), and the clad composition was identical except that 10.00 mole percent (9.1 wt. %) calcium oxide replaced the 10.00 mole percent barium oxide (21.6 wt. %). Fibre having a core diameter of 80 μm was drawn in an Engelhard platinum double crucible with a 10 cm nozzle.

Figure 9:
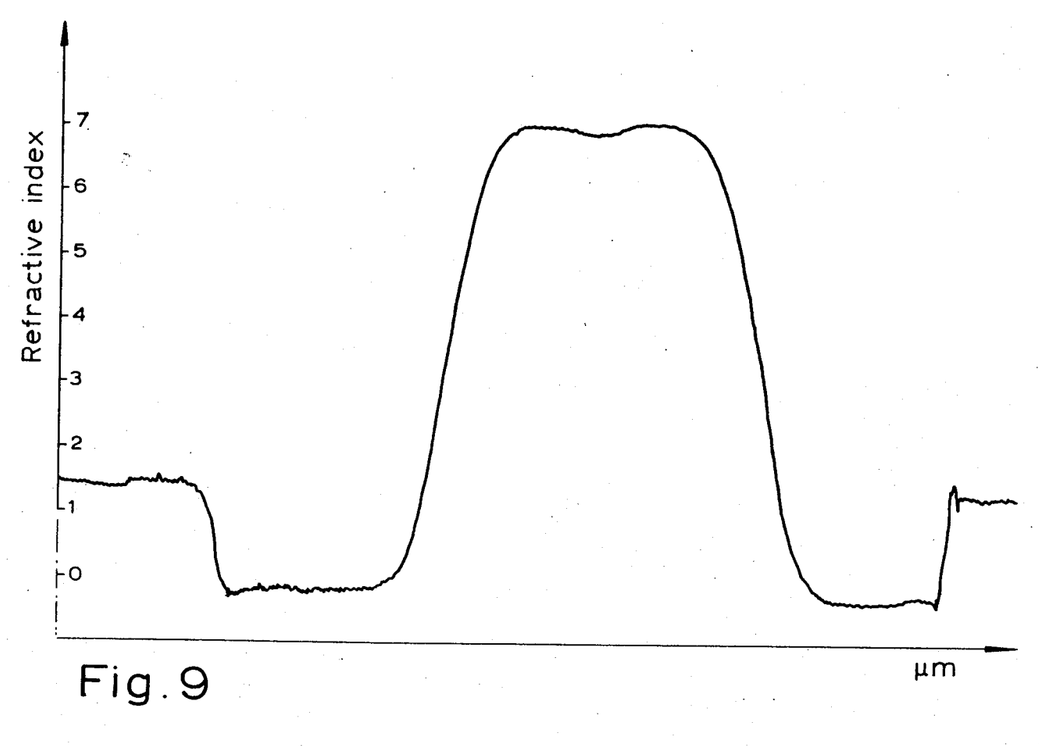
FIG. 9 shows the refractive index profile of the fibre of Example 6.

The refractive index profile is shown in FIG. 9. The $\phi$-value was calculated to be about 0.02, ie. the fibre was considerably under-diffused. This is believed to be largely attributable to the fact that it was made in a crucible designed for large-core slightly-graded fibre; use of the Johnson Mathey crucible used in Examples 1 to 5 would be expected, on the basis of previous experiments, to increase significantly the extent of diffusion. The maximum numerical aperture of the fibre was 0.210.

What is claimed is:

1. An optical fiber having
   (a) a total insertion loss of less than 20 dB/km,
   (b) a graded refractive index in which gradation of the refractive index is produced by thermal diffusion of alkaline earth metal ions,
   (c) a cladding formed from a first glass composition consisting essentially of sodium oxide, boric oxide, silica and optionally alkaline earth metal oxide, said first glass composition being within the range defined by region A of FIG. 1 of the drawings or derived from a composition within that range by partial replacement of sodium oxide or sodium oxide and silica by alkaline earth metal oxide in a proportion not exceeding 20 mole percent, said first glass composition being non-devitrifying and non-phase-separating under optical fiber production conditions, and
   (d) a core formed from a second glass composition consisting essentially of sodium oxide, boric oxide, silica and alkaline earth metal oxide, said second glass composition being derived from a composition within the range defined by region A of FIG. 1 of the drawings by partial replacement of sodium oxide or sodium oxide and silica by alkaline earth metal oxide in a proportion not exceeding 20 mole percent and sufficient to raise the refractive index to a value at least 1 percent higher than that of said first glass composition, said second glass composition being non-devitrifiying and non-phase-separating under optical fiber production conditions.

2. An optical fiber as claimed in claim 1, wherein said first glass composition is a sodium oxide-boric oxide-silica composition lying within the range defined by region A of FIG. 1 of the drawings and said second glass composition is derived from said first glass composition by partial replacement of sodium oxide and silica by alkaline earth metal oxide in a proportion not exceeding 20 mole percent and sufficient to raise the refractive index to a value at least 1 percent higher than that of said first glass composition.

3. An optical fiber as claimed in claim 1, wherein the first glass contains the oxide of a first alkaline earth metal oxide and the second glass contains the oxide of a second alkaline earth metal, the atomic number of said first alkaline earth metal being lower than the atomic number of said second alkaline earth metal.

4. An optical fiber as claimed in claim 3 wherein the first alkaline earth metal is calcium and the second alkaline earth metal is barium.

5. An optical fiber as claimed in claim 3, wherein the first alkaline earth metal is magnesium and the second alkaline earth metal is calcium.

6. An optical fiber as claimed in claim 1, wherein said first glass composition and said second glass composition are derived from the same sodium oxide-boric oxide-silica composition lying within the range defined by region A of the drawings by partial replacement of sodium oxide or sodium oxide and silica by alkaline earth metal oxide.

* * * * *